United States Patent
He et al.

(10) Patent No.: US 11,290,992 B2
(45) Date of Patent: Mar. 29, 2022

(54) UPLINK CONTROL INFORMATION COLLISION HANDLING

(71) Applicant: Apple Inc., Cupertino, CA (US)

(72) Inventors: Hong He, Cupertino, CA (US); Dawei Zhang, Saratoga, CA (US); Haitong Sun, Irvine, CA (US); Jia Tang, San Jose, CA (US); Pengkai Zhao, San Jose, CA (US); Wei Zeng, San Diego, CA (US); Wei Zhang, Santa Clara, CA (US); Yuchul Kim, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 16/990,322

(22) Filed: Aug. 11, 2020

(65) Prior Publication Data

US 2021/0051649 A1 Feb. 18, 2021

Related U.S. Application Data

(60) Provisional application No. 62/887,427, filed on Aug. 15, 2019.

(51) Int. Cl.
*H04W 72/04* (2009.01)
*H04W 72/10* (2009.01)
*H04W 74/08* (2009.01)

(52) U.S. Cl.
CPC ..... *H04W 72/0413* (2013.01); *H04W 72/044* (2013.01); *H04W 72/10* (2013.01); *H04W 74/0825* (2013.01)

(58) Field of Classification Search
CPC ........... H04W 72/0413; H04W 72/044; H04W 72/10; H04W 72/1242; H04W 72/1268; H04W 72/1284; H04W 74/0825
See application file for complete search history.

(56) References Cited

U.S. PATENT DOCUMENTS

| 9,669,376 | B2 | 5/2017 | Benveniste | |
|---|---|---|---|---|
| 2019/0182665 | A1 | 6/2019 | Edge | |
| 2019/0246249 | A1 | 8/2019 | Lee et al. | |
| 2020/0314900 | A1* | 10/2020 | Hosseini | H04W 72/10 |
| 2020/0344780 | A1* | 10/2020 | Choi | H04W 72/1268 |

OTHER PUBLICATIONS

VIVO; "Discussion on eMBB and URLLC UCI multiplexing"; 3GPP TSG WG1 Meeting #93 R1-1806064; Busan, Korea; May 25, 2018; 4 pages.
Huawei, Hisilicon; "UL intra-UE mulitplexing"; 3GPP TSG RAN WG1 Ad-Hoc Meeting 1901 R1-1900868; Taipei; Jan. 21, 2019; 6 pages.
Huawei, Hisilicon; "Discussion on resource conflicts between uplink grants"; 3GPP TSG RN WG1 Meeting #97 R1-1906064; Reno, USA; May 13, 2019; 4 Pages.
Interdigital; "Intra UE prioritization between SR and PUSCH"; 3GPP RAN WG2 Meeting #106 R2-1906409 Reno, USA; May 13, 2019; 3 Pages.

* cited by examiner

*Primary Examiner* — Kashif Siddiqui
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE) to group transmissions into one or more groups, e.g., of various priority levels and/or types of transmissions. The UE may resolve collisions, e.g., according to one or more procedures described herein. The UE may transmit the transmissions according to the resolutions.

20 Claims, 9 Drawing Sheets

UPLINK CONTROL INFORMATION COLLISION HANDLING

PRIORITY CLAIM

This application claims priority to U.S. provisional patent application Ser. No. 62/887,427, entitled "Uplink Control Information Collision Handling," filed Aug. 15, 2019, each of which is hereby incorporated by reference in its entirety as though fully and completely set forth herein.

TECHNICAL FIELD

The present application relates to wireless devices, and more particularly to apparatuses, systems, and methods for transmitting uplink control information.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

In some instances, for example in 5G new radio (NR), various service types with different reliability and/or latency requirements may be supported. For a UE running mixed services, requirements for uplink control information may differ significantly. Thus, improvements in the field are desirable.

SUMMARY

Techniques, apparatuses, systems, and methods are disclosed for a user equipment (UE) device to perform transmission of various types of information, e.g., uplink control information (UCI), associated with one or more service types. The UE may comprise at least one antenna for performing wireless communications, a radio coupled to the at least one antenna, and a processor coupled to the radio, and may be configured to communicate in a wireless fashion with a wireless (e.g., cellular) network via at least one type of radio access technology (RAT).

In some embodiments, the UE may group uplink transmissions into one or more groups, e.g., of various priority levels and/or types of transmissions. The UE may resolve collisions between two or more uplink transmissions, e.g., according to one or more embodiments described herein. The UE may transmit the transmissions according to the resolutions.

In some embodiments, a non-transitory memory medium may include program instructions executable by a UE that, when executed, cause the UE to perform at least a portion or all of the above operations. In some embodiments, a method performed by the UE may include the UE performing the above operations. In some embodiments, a method performed by a base station or network element may include the base station or network element performing corresponding operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
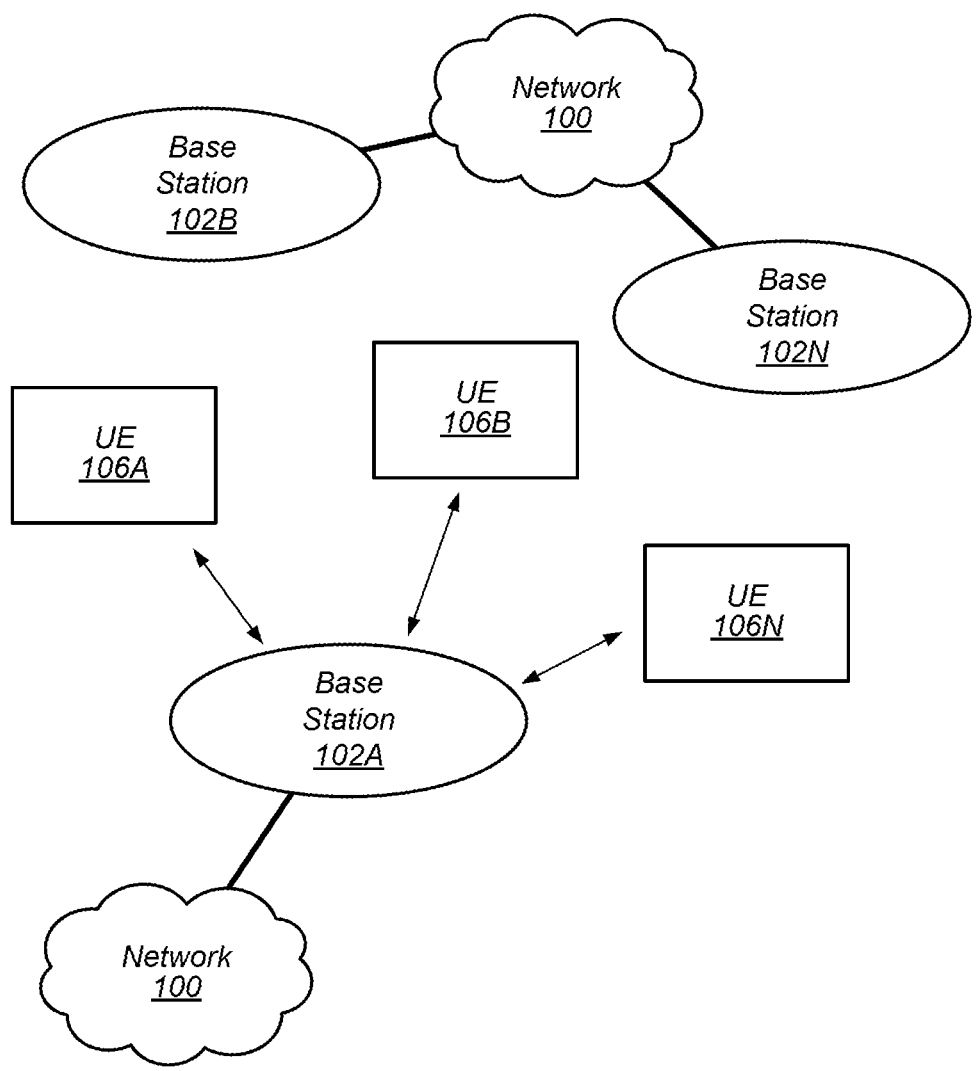
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms may be used in the present Patent Application:

UE: User Equipment
BS: Base Station
ENB: eNodeB (Base Station)
LTE: Long Term Evolution
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System RRC: Radio Resource Control
IE: Information Element
QoS: Quality of Service
QoE: Quality of Experience
TFT: Traffic Flow Template
RSVP: Resource ReSerVation Protocol
API: Application programming interface Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Figure 2:
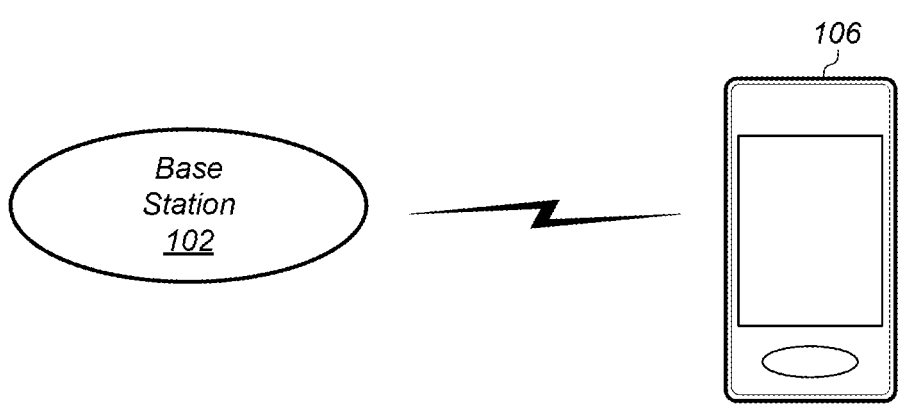
FIG. 2 illustrates a base station (BS) in communication with a user equipment (UE) device, according to some embodiments.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component. FIGS. 1 and 2—Communication System FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
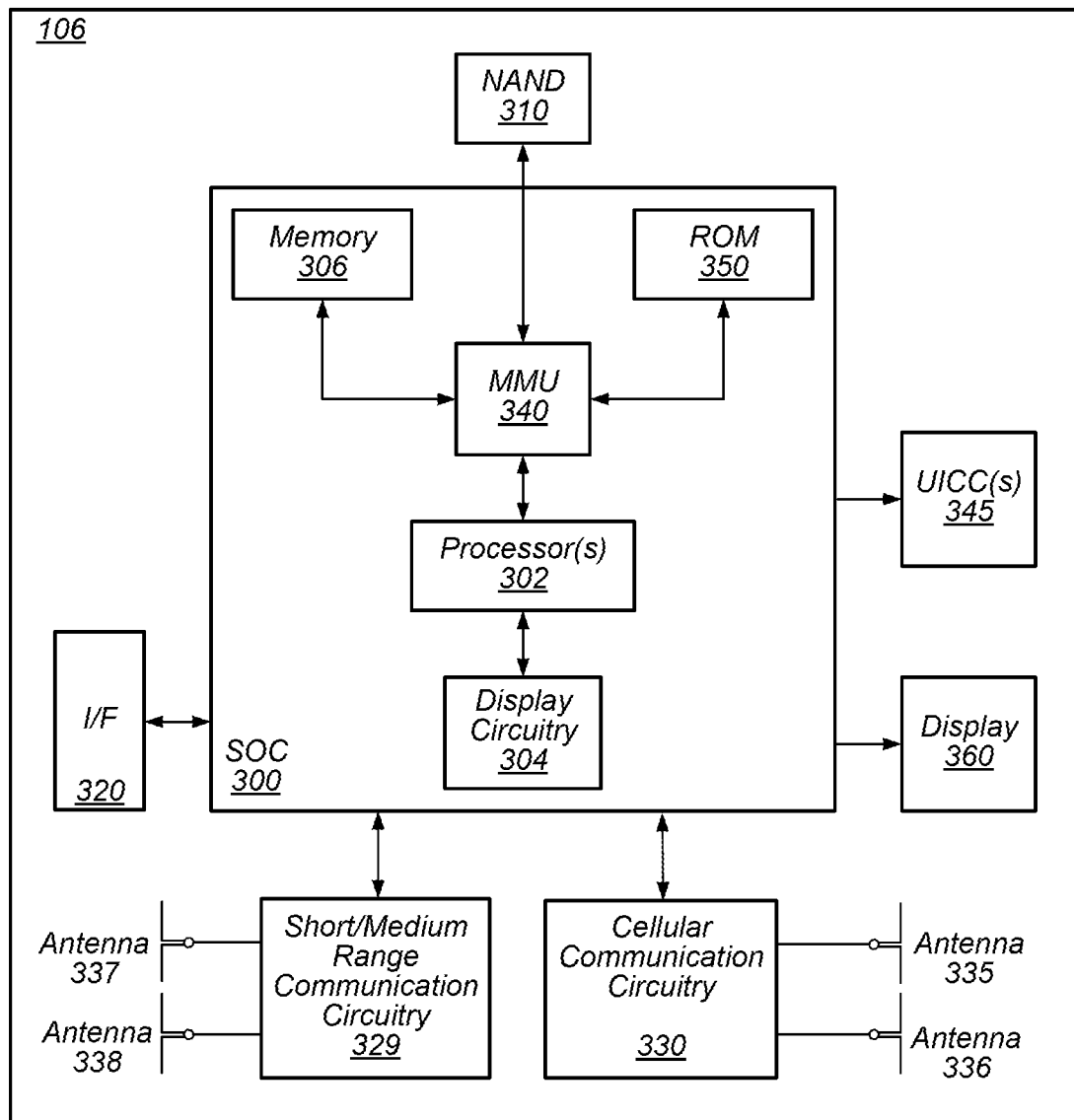
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
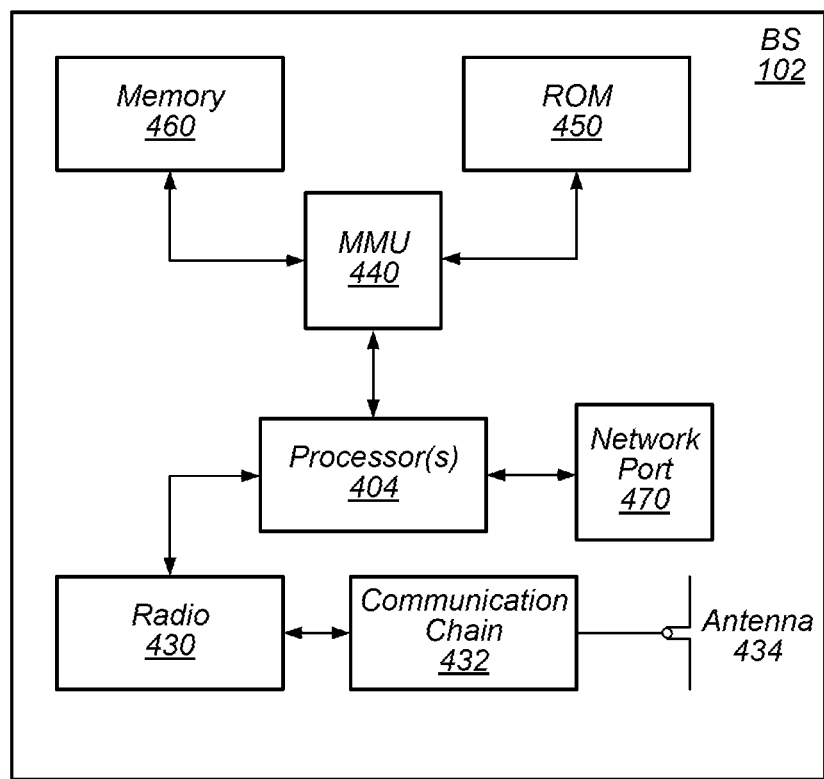
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
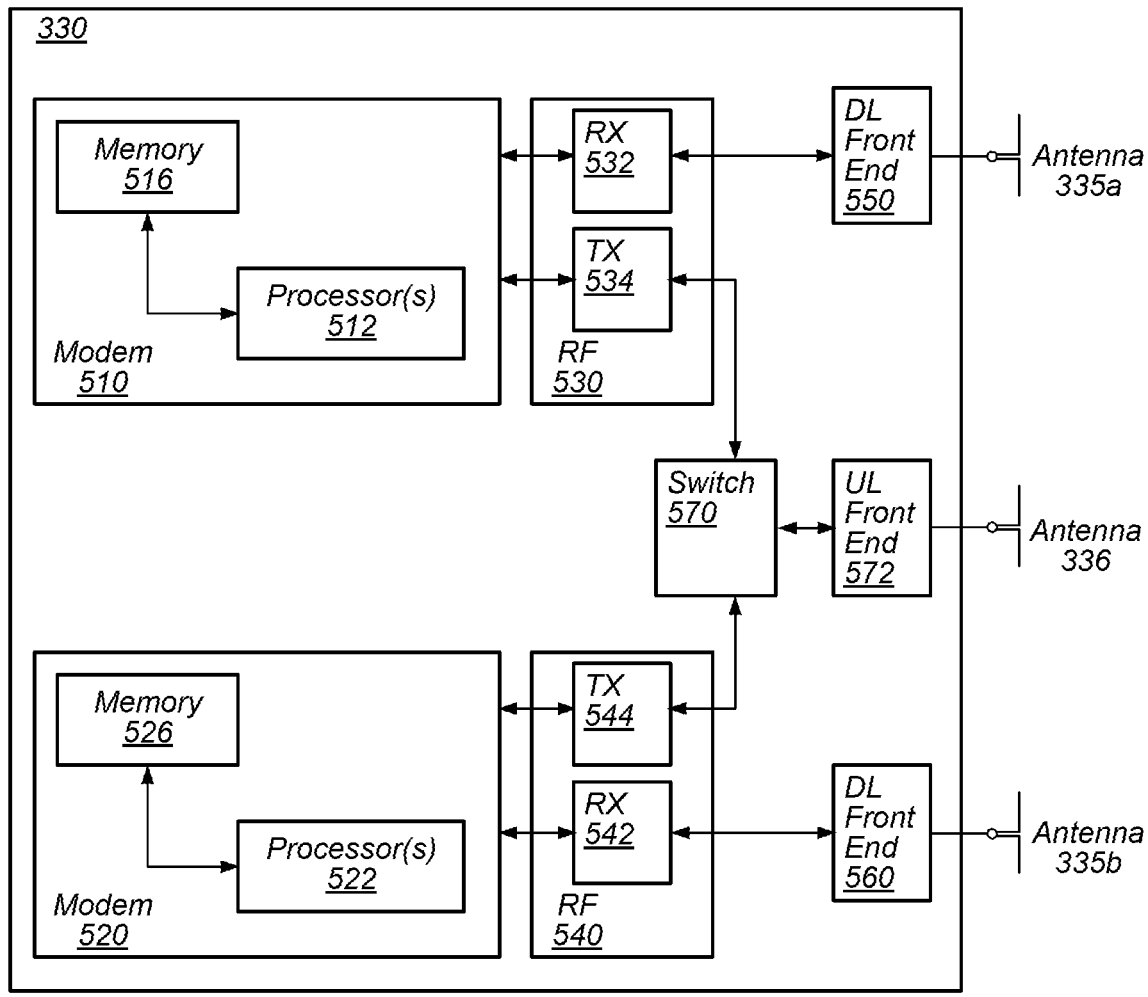
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch (e.g., and/or combiner, multiplexer, etc.) 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, modem 510 and modem 520 may be configured to transmit at the same time, receive at the same time, and/or transmit and receive at the same time. Thus, when cellular communication circuitry 330 receives instructions to transmit according to both the first RAT (e.g., as supported via modem 510) and the second RAT (e.g., as supported via modem 520), combiner 570 may be switched to a third state that allows modems 510 and 520 to transmit signals according to the first and second RATs (e.g., via a transmit circuitry 534 and 544 and UL front end 572). In other words, the modems may coordinate communication activity, and each may perform transmit and/or receive functions at any time, as desired.

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
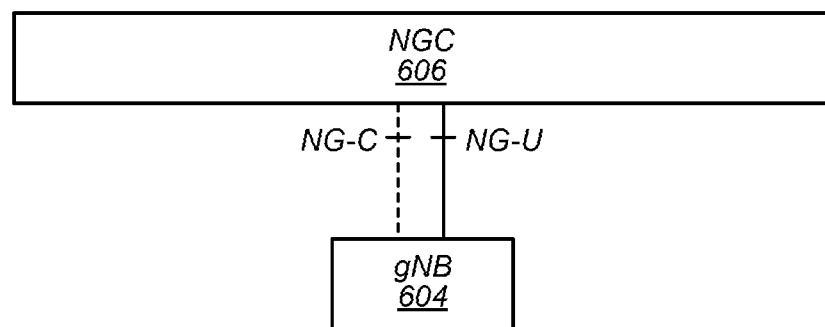
FIGS. 6 and 7 illustrate examples of a 5G NR base station (gNB), according to some embodiments.
Figure 7:
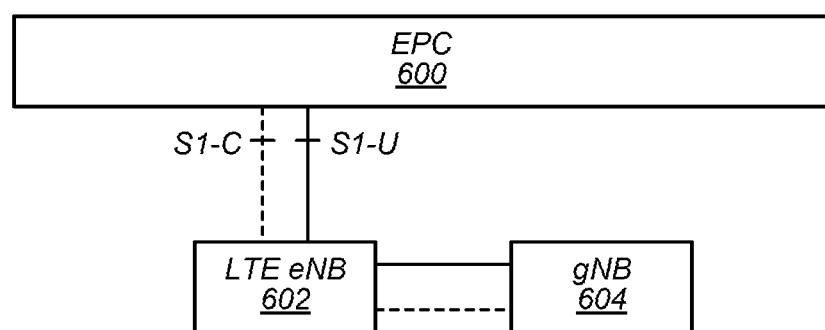

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
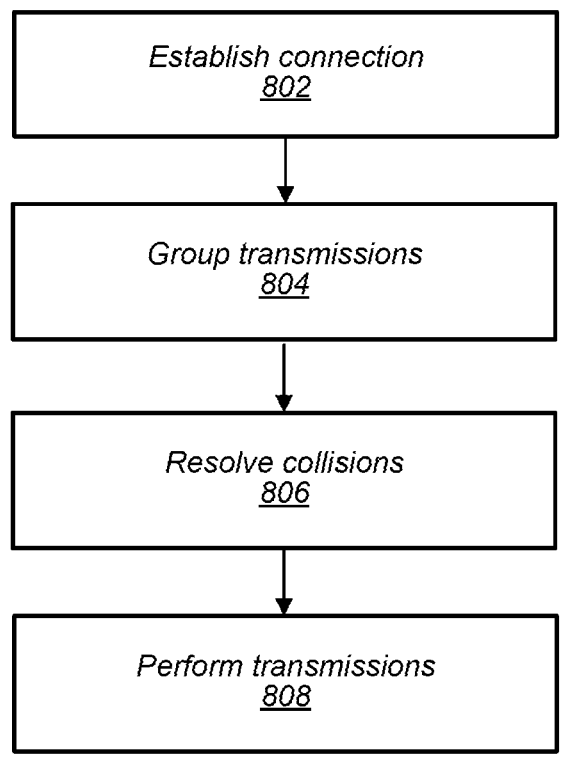
FIG. 8 is a flow chart diagram illustrating an example method for uplink control information (UCI) collision handling, according to some embodiments.

FIG. 8—Uplink Control Information (UCI) Collision Handling

In some embodiments, 5G NR networks may be designed to support three main service categories: enhanced mobile broadband (eMBB), Ultra-reliable low latency communication (URLLC), and massive machine type communication (mMTC). These different service categories may have significantly different latency requirements and reliability requirements. As one example, the latency and/or reliability targets for two services e.g., eMBB and URLLC may be summarized as follows. For eMBB, average latency of less than 4 ms (e.g., in the downlink (DL) and/or uplink (UL) directions) may be desired, while, for URLLC, average latency of less than 0.5 ms (e.g., DL and/or UL) may be desired. Further, for eMBB, the desired reliability target may be a block error rate (BLER) of less than 0.1 in contrast to URLLC, which may have a target BLER of 0.000001. In other words, the latency and reliability targets/requirements for URLLC service may be many times higher (e.g., stricter or more stringent) than for eMBB service. Notably, eMBB may instead focus on high throughput applications (e.g., gaming, streaming), in contrast to URLLC which may focus on high reliability and minimal latency use cases (e.g. factory automations, vehicular automation, and remote surgery, etc.). It will be appreciated that in this disclosure, for ease of explanation phrases similar to "high (e.g., or higher) reliability targets" may be used to refer to either or both of high(er) reliability and/or low(er) latency; phrases similar to "low(er) reliability targets" may refer to lower reliability and/or higher latency. Thus, eMBB may have higher throughput targets than URLLC, which may have higher reliability targets (e.g., including lower latency targets) than eMMB.

Accordingly, for a UE 106 communicating according to multiple service categories, reliability and latency targets may vary significantly. Further, the targets of UCI transmitted on physical uplink shared channel (PUSCH) may differ significantly from targets for PUSCH data. The reliability and latency targets on UCI may either be higher than the targets on the PUSCH data or may be lower. For example, when transmitting UL hybrid automatic repeat request (HARQ) acknowledgements (ACK) or negative acknowledgement (NACK) (e.g., PUCCH) for DL URLLC data at the same time as transmitting UL eMBB data (e.g., PUSCH), a reliability target for the HARQ-ACK for URLLC PUSCH may be higher. Conversely, when transmitting CQI reporting (e.g., PUCCH) for eMBB at the same time with URLLC data (e.g., PUSCH), the UCI (e.g., CQI report in this example) reliability target may be lower than the reliability target for the PUSCH of URLLC service.

Accordingly, how to design a UCI transmission scheme (e.g., on Physical Uplink Control Channel (PUCCH) or PUSCH) with different service types may be a critical issue to achieve efficient 5G NR UL resource utilization for mixed service type use cases. Further, it may be beneficial to design such a scheme to avoid excessive UL control overhead, e.g., to ensure the best throughput performance of eMBB, but still meet the stringent reliability/latency targets of URLLC.

FIG. 8 is a flow diagram which illustrates exemplary aspects of a scheme for transmitting information (e.g., UCI). The techniques of FIG. 8 may allow for a UE to categorize and prioritize transmissions, e.g., to efficiently use resources and to meet reliability targets of various service types. Notably, the techniques of FIG. 8 may allow for a UE to perform this categorization and prioritization at a low level, e.g., at a physical (PHY) layer, e.g., thus avoiding or minimizing processing delay associated with performing such functions at a higher layer (e.g., Radio Resource Control (RRC) layer). Aspects of the method of FIG. 8 may be implemented by a UE 106 in communication with a BS 102, as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, etc.) may cause the UE or base station(s) to perform some or all of the illustrated method elements. For example, a baseband processor of the UE may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. Further, the method may be applied in other contexts (e.g., between multiple UEs, e.g., in device-to-device communications). Similarly, note that while at least some elements of the method are described in a manner relating to UL transmissions, such description is not intended to be limiting to the disclosure, and aspects of the method may be used in UL and/or DL communications, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may establish a connection with a BS 102 (802), according to some embodiments. The connection may be or include a cellular connection, e.g., operating according to one or more wireless standards. The connection may include a WLAN connection, e.g., in addition to or instead of a cellular connection, according to some embodiments. Alternatively, or additionally, the connection may include a cellular connection using unlicensed spectrum.

The UE and BS may exchange data and/or control information, e.g., in the UL and/or DL directions. For example, the BS may use radio resource control (RRC) signaling (and/or other higher layer signaling) to configure the UE to categorize and/or prioritize various transmissions according to the techniques described herein. Such configuration may include any of various details, information, etc. For example, priority information for various types of (e.g., Type 2, as discussed further below) UL transmissions, may be provided. Similarly, code rate information for various types of UL transmissions may be provided.

In some embodiments, the UE may indicate one or more characteristics of the UE such as UE capability information to the BS. For example, the UE may transmit an indication of a minimum processing time (e.g., N' symbols) of a UL transmission of a higher priority (e.g., PUSCH associated with URLLC services). For example, N' may represent the processing time for a URLLC data transmission in symbols. Further, the UE may transmit a separate value d>=0, indicating an additional amount of time (e.g., measured in symbols) on top of N' symbols that is necessary to perform operations as further described below, e.g., to drop or interrupt the overlapped uplink transmissions of a lower priority. Such an indication may be signaled as part of the UE capability information. Alternatively, some parameters (e.g., d value) may be hard-encoded and predefined in 3GPP specification or other standard document, and therefore may not be indicated to the network by the UE, according to some embodiments.

The network and/or BS may schedule UL transmission subject to the indication of the minimum processing time (e.g., N=N'+d) from the UE. For example, the network may schedule DL transmissions to the UE at a first time such that the UE (e.g., accounting for processing time) may be expected to respond with HARQ-ACK bits at an appropriate time (e.g., on appropriate PUSCH and/or PUCCH resources) consistent with the indicated N' and d values.

The UE 106 may group one or more (e.g., UL) transmissions (804), according to some embodiments. The transmissions may be grouped based on priority level and/or transmission type, among various possibilities. The transmissions may be grouped, e.g., at a physical (PHY) layer, or other lower layer, of the UE. For example, an application layer of the UE may generate the transmissions and provide the transmissions to the lower layer for transmission. The lower layer may perform the grouping and/or other functions prior to transmission. The UE may group transmissions according to priority level, e.g., a UE may determine respective priority levels for respective transmissions a plurality of transmissions, and divide/sort the plurality of transmissions into groups based on the respective priority levels. In other words, for a transmission of a slot, the UE may determine a priority level and add the transmission to a group corresponding to the priority level.

For example, the priority level may be associated with various service types, e.g. 5G service types. For example, ULRRC transmissions may be associated with a first priority level, eMBB transmissions may be associated with a second priority level, and mMTC communications may be associated with a third priority level. In some embodiments, ULRRC transmissions may be assigned a higher priority than eMBB or mMTC communications. Furthermore, UL transmission with eMBB may be assigned with a higher priority than that of mMTC. In some embodiments, additional or different priority levels may be associated with other attributes (e.g., application type, etc.).

In some embodiments, in order to group the transmissions by priority, the transmissions may be first categorized into two categories/types, e.g., depending on whether there is a Downlink Control Information (DCI) format associated with the transmissions (e.g., a DCI format may be associated with one or more UL channel, or vice versa). For example, the two types may be referred to as Category or Type 1 (hereinafter "Category 1") and Category or Type 2 (hereinafter "Category 2" UL transmissions.

Category 1 UL transmissions may include HARQ-ACK information, Aperiodic Channel State Information (A-CSI), and/or PUSCH (e.g., dynamic scheduling based and/or Type 1 Configured Grant (CG) based), among other example transmissions.

Note that various 3GPP standards documents may describe Type 1 and/or Type 2 configured grants (CG). Type 1 CGs may be grants for multiple UEs to share periodically allocated resources and may be signaled using RRC. Type 2 CGs may be configured by RRC, and activated and/or deactivated using L1 (e.g., PHY) signaling. It will be appreciated that, as used herein, the terms Category 1 transmissions and Category 2 transmissions are distinct from Type 1 CGs and Type 2 CGs.

The association between each Category 1 UL channel and respective DCI Format is provided in Table 1.

|  | Type of UL transmissions: | | |
| --- | --- | --- | --- |
|  | HARQ-ACK | A-CSI | PUSCH |
| Associated DCI format: | DCI Format 1-0 or 1-1; schedules the corresponding physical downlink shared channel (PDSCH) or semi-persistent scheduling (SPS) release that UE acknowledges via this HARQ-ACK (or NACK) | DCI Format 0-0 or 0-1; triggers A-CSI report | DCI Format 0-0 or 0-1; schedules PUSCH transmission and/or activates Type-2 CG-PUSCH |

Category 2 UL transmissions may include all other UL transmissions that are not associated with DCI formats, e.g., including scheduling requests (SRs), Periodic Channel State Information (P-CSI), and/or Type-1 and/or Type-2 CG based PUSCH (CG-PUSCH).

Figure 9:
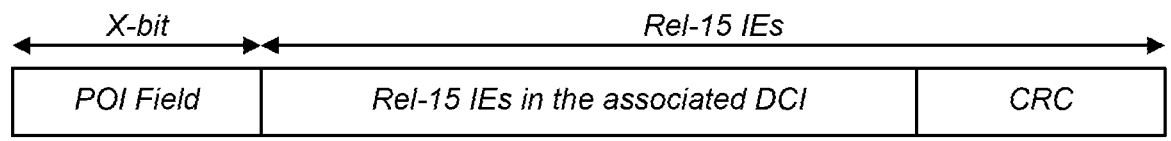
FIG. 9 illustrates an example priority order indicator (POI), according to some embodiments.

A UE may, e.g., at a lower level such as a physical (PHY) layer, determine the priority level of a Category 1 UL transmissions based on a DCI format or an indication in a DCI format. For example, according to certain aspects of this disclosure, the priority level of a Category 1 UL transmission may be explicitly indicated by an information field (IE) in the associated DCI format. An example of such an indication is illustrated in FIG. 9. A Priority Order Indicator (POI) may be 0 or X bits. The number of priority orders may be related as $2^X$, ranging from 0 to $2^X-1$. For example, if there are two priority levels (e.g., a first level for URLLC and a second level for eMBB), then the length of the POI (e.g., X) may be 1 bit in order to indicate which of the two priority levels is associated with the DL transmission. Similarly, if three levels are included, X may be 2 (e.g., POI may be X=2 bits long and $2^X-1=2^2-1=3$ priorities). Thus, based on the POI field of a DL transmission, the UE may (e.g., at the PHY level, e.g., without consulting higher levels such as an application layer or application processor) determine the priority level of a corresponding UL transmission (e.g., UCI).

In some designs, the presence and number of bits of a POI field in the associated DCI format (e.g., X value) may be configured by higher layers. More specifically, the POI field may be not present (e.g., the POI field may be 0 bits) for a UE that supports only one service type (e.g. eMBB or URLLC services, but not both), or for the case that only one service type is activated during a certain period. In other words, the BS may use the POI field in one or more DL transmissions to signal priority to UEs if multiple priorities are configured for the UE (e.g., at the same time or at overlapping times) and may not use the POI field (e.g., X=0) if only a single priority is configured for the UE. For example, the UL transmission of URLLC service may be indicated with a higher priority, e.g., via POI or another indication, compared to the corresponding eMBB service, if both of two services are activated at a given UE.

The priority level of various types of Category 2 UL transmissions may be configured by higher layers (e.g. RRC signaling) as part of configuration (e.g., in 802). For example, priority levels may be assigned for one or more of: Type-1 CG PUSCH, SR transmission, and P-CSI reporting. The priority levels for these types of UL transmissions may be the same or different. Thus, the PHY level of the UE may determine the priority level of a category 2 UL transmission based on the type of transmission, e.g., as indicated in the configuration information.

For example, a UE may determine that a UL transmission is not associated with DCI, e.g., determine that it is a Category 2 transmission. The UE may determine a type of the transmission (e.g., Type-1 CG PUSCH, SR transmission, or P-CSI reporting, or other types of UL transmissions not associated with DCI), and based on the type of the transmission, the UE may determine a priority level (e.g., based on configuration information for the type of transmission).

Thus, the UE may, e.g., at a PHY level, determine the priority level of the transmissions, e.g., of one or both of Category 1 and Category 2 based on the POI and/or configuration information. The UE may group the transmissions by priority level, e.g., by determining the priority levels of respective transmissions and comparing the priority levels. For example, a group of transmissions with a first priority level may include any number of Category 1 UL transmissions (e.g., the priority level of which may be determined based on respective POI, if multiple services are active at the UE). Further, the group of transmissions with the first priority level may include any number of Category 2 UL transmissions (e.g., the priority level of which may be determined based on respective types of the UL transmissions). In some embodiments, a Category may be associated with how priority level is determined; Category may not directly indicate priority level.

The UE may detect and resolve any (e.g., inter-priority and/or intra-group) collisions (806), according to some embodiments. A collision may be an instance when multiple transmissions are overlapped in the time domain. The UE may detect and resolve the collisions at the PHY level and/or another low level of the UE. For example, a baseband processor or modem of the UE may perform the processing necessary to detect and resolve the collisions independently of an application layer or other higher layer of the device. Example collision resolutions include: delaying or dropping one or more transmission (e.g., scheduling the transmission for a later time or not doing the transmission at all); stopping one or more transmission early (e.g., allowing for a second, higher priority transmission, to start); adjusting the amount(s) of time and/or frequency resources allocated to one or more transmission (e.g., decreasing the amount of resources for one transmission so that more resources are available for a higher priority transmission, e.g., so that the higher priority transmission may be performed with a code rate or MCS sufficient to meet a high reliability target (e.g., BLER less than a threshold)); and/or adjusting the start time of one or more transmissions (e.g., so that low latency target transmissions may start early enough to meet the latency target). It will be appreciated that the collision resolution techniques described herein may apply to collisions of one or more 5G service types. These collision resolution techniques may be applied on very small time scales, e.g., within a slot or a small number of symbols, according to some embodiments.

As used herein, inter-priority or inter-group collisions may refer to transmissions of different priority levels (e.g., a group of one or more transmissions of a first priority level colliding with a group of one or more transmissions of a second priority level). For example, in the case of collisions between groups with different priority levels (e.g., an inter-priority collision), transmission of the lower priority group(s) may be delayed (e.g., to a later symbol(s) within a slot and/or to a later slot(s)) to accommodate the transmission of the higher priority group(s). An intra-group collision may refer to a collision between multiple transmissions of a same priority level, e.g., within a group. For example, the UE may determine the resources (e.g., amount of time and/or frequency resources and/or the location/time of the resources) to use for multiplexing transmissions within a group of transmissions, e.g., to resolve intra-group collisions. In some embodiments, some transmissions (e.g., within the group) may be dropped or delayed, e.g., based on an intra-group collision. Various procedures and/or rules for resolving collisions, e.g., within a slot, are discussed below.

Figure 10:
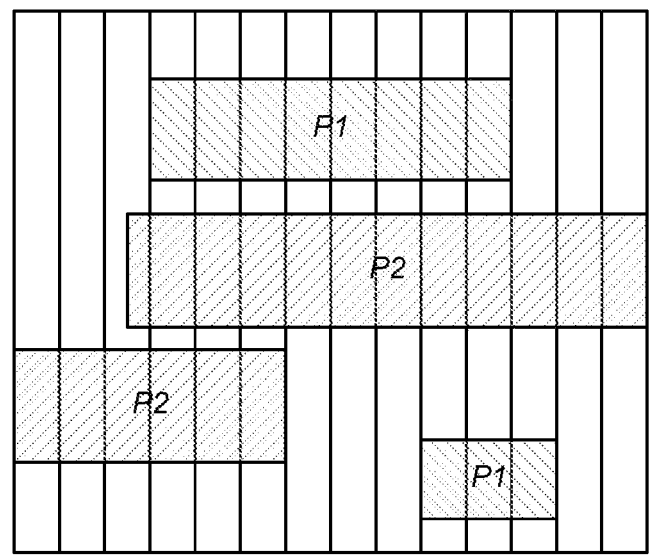
FIG. 10 illustrates an example grouping of uplink transmissions, according to some embodiments.

A first procedure for resolving (e.g., inter-priority) collisions may include dropping lower priority transmissions in order to prioritize (or transmit) higher priority transmissions. For example, when there is collision between transmissions with different priorities, the transmission with lower priority order may be dropped or stopped early (e.g., starting from the first symbols overlapped with UL transmission of higher priority orders). FIG. 10 illustrates an exemplary slot (e.g., with 14 symbols in the time domain, e.g., arranged along the horizontal axis; the vertical axis may represent the frequency domain resources) with overlapping transmissions of two priority levels: a higher priority 1 (P1) and a lower priority 2 (P2), according to some embodiments.

In some embodiments, the two P1 transmissions may form a first group associated with a same URLLC service type. For example, a first P1 transmission (e.g., starting from the $4^{th}$ symbol) may be a PUCCH transmission with HARQ-ACK and a second P1 transmission (e.g., starting from the $10^{th}$ symbol) may be a PUSCH transmission with A-CSI transmission. Similarly, the two P2 transmissions may form a second group e.g. associated with the eMBB service type. A first P2 transmission may be a PUCCH transmission with HARQ-ACK and another may be a PUCCH with SR transmission. Transmissions may be multiplexed within each of the groups according to processes described herein (e.g., see the discussion of the various procedures for intra-group transmissions discussed below). Further, transmissions may be multiplexed between the groups under some circumstances.

In some embodiments, transmission of some or all of the P2 transmissions may be dropped based on the P1 transmissions, e.g., according to the first procedure. For example, the P2 transmissions may be stopped at symbol 4, e.g., at the beginning of the transmission of the first P1 transmission. In other words, the P1 transmissions may be grouped, and the group of P1 transmissions may extend from the $4^{th}$ symbol through (e.g., including) the $12^{th}$ symbol. The group of P1 transmissions may be higher priority than the group of P2 transmissions (e.g., which may include transmissions for all symbols of the slot). The P2 transmissions may be performed during the first three symbols of the slot. The P2 transmissions may be dropped (e.g., delayed for a later time) during the $3^{rd}$ through $12^{th}$ symbols of the slot, e.g., to allow for the transmission of the P1 group of transmissions. The P2 transmissions may be resumed in the $13^{th}$ and $14^{th}$ symbols of the slot. Note that the P2 transmissions/data that would have been transmitted during the $3^{rd}$ through $12^{th}$ symbols may be transmitted beginning in the $13^{th}$ and $14^{th}$ symbols, or at a later time (e.g., in a later slot(s)). In some embodiments, collision resolution (e.g., multiplexing) within each group (e.g., the P1 group individually and the P2 group individually) may be performed according to one or more of the intra-group procedures discussed herein, among various possibilities.

In some embodiments, the UE may allocate additional resources (e.g., additional symbols such as the $13^{th}$ and $14^{th}$ symbol, etc.) to the P1 group, e.g., in order to meet reliability and/or latency targets for the P1 group. For example, allocating additional resources to the P1 group may allow the P1 transmissions to proceed using a lower modulation and coding scheme (MCS).

In some embodiments, the minimum processing time of the UL channel with the higher priority order (e.g., P1, e.g., associated with URLLC services) may be increased by a number, d, of symbols (e.g., d>=0), accounting for the interruption time for the dropping operation, e.g., due to sharing the processing capability at the UE side. In other words, the processing of P1 transmissions may be slower by d symbols due to the processing to detect the collision and drop the P2 transmissions. For example, if processing transmissions would take 10 symbols without comparing priority levels (e.g., N'=10), and processing transmissions including comparing priority levels and dropping transmissions (e.g., if an overlap is found) takes 11 symbols (e.g., N=N'+d), then d may be equal to 1. In some embodiments, the value of d (e.g., and/or a gross processing time, including processing associated with the comparison and the dropping) may be indicated as part of UE capability, e.g., or predefined in 3GPP or other specifications.

A second procedure for resolving (e.g., inter-priority) collisions may relate to transmissions for SR and data. In case of collision between an SR (e.g., to be transmitted on PUCCH or potentially PUSCH) and data for other channels (e.g., PUSCH), a variety of UE behaviors for selecting resources may be applied at least depending on the type of overlapping UL transmissions. In other words, the UE may adjust one or more UL transmissions in response to the collision by selecting resources and adjusting the transmission to fit the selected resources.

As a first example, in case of a positive SR (e.g., the UE has data to transmit, and is ready to request an UL grant via an SR), the UE may drop PUSCH data with lower priority order and transmit an SR with higher priority order. For example, the PUSCH data may be associated with eMBB while the SR may be associated with URLLC. Alternatively, in the case that the PUSCH data is higher priority, the UE may drop the SR and transmit the PUSCH data. This design may offer the benefit of simplicity, but may result in PUSCH throughput loss for lower priority services (e.g. eMBB).

As a second example, the UE may multiplex SR (e.g., of a higher priority order) and PUSCH (e.g., with lower priority order) in the PUSCH resources. In this approach, a UE may be configured with different beta offset values for different priority orders. The different beta offset values may be used by the UE to determine a number of resources (e.g., a number of resource elements (RE) and/or other time/frequency resources) and/or a location of the resources for multiplexing SR information in a PUSCH with different priority order. For example, beta offset may be as shown below:

$$\beta_{offset}^{SR,n}, n=0 \ldots, N-1$$

In some designs, two beta offset values may be configured with one-to-one association with priority order. For example, a first beta offset:

$$\beta_{offset}^{SR,0}$$

may be used for calculation of a number of resources for SR with priority order 0 in PUSCH with different priority order (e.g., priority order 1) in case they are overlapped. A second beta offset:

$$\beta_{offset}^{SR,1}$$

may be used for calculation of a number of resources for SR with priority order 1 in PUSCH with different priority order (e.g. priority order 0) in case they are overlapped. In other words, a beta offset may be applied by the UE to determine what resources (e.g., and/or how many resources) to use in order to multiplex a SR with UL data to transmit in PUSCH. For example, if the SR is higher priority than the PUSCH data, the SR may be allocated relatively more resources (e.g., allocation of resources for PUSCH data may be decreased leaving more resources available for the SR e.g., for a lower coding rate of the SR, e.g., improving the likelihood of successful decoding and thus reliability of the SR transmission) and the resources may be positioned earlier (e.g., for lower latency of the SR). In contrast, if the SR is lower priority than the PUSCH data, the SR may be allocated relatively fewer resources (e.g., for a lower coding rate of the PUSCH data) and the resources may be positioned later (e.g., for lower latency of the PUSCH data). In various embodiments, beta offset may be used to determine the amount of resources used for SR and/or the location of the resources used for SR.

In some embodiments, beta offsets equal to zero:

$$\beta_{offset}^{SR,0}, \beta_{offset}^{SR,1}=0$$

may be supported and a beta offset equal to zero may be dynamically indicated as part of DCI Format that schedules PUSCH transmission. This approach may provide the flexibility for the network to cause the UE to skip SR transmission (e.g., beta offset equal to zero may indicate that the SR should not be transmitted by the UE) if the SR has relatively low priority (e.g. SR of eMBB service), compared to PUSCH priority order (e.g., PUSCH of URLLC). Further, if beta offset is indicated in DCI as equal to zero and the PUSCH and SR have a same priority order, then the UE may conceal (e.g., not transmit) the SR and may (e.g., only) transmit the corresponding Buffer Status reporting (BSR) on the PUSCH channel, e.g., multiplexed with the PUSCH data. For example, based on a beta-offset equal to 0, the UE may indicate that it has UL data to transmit (e.g., via the BSR) without transmitting the SR, thus freeing more resources for the PUSCH transmission.

In some embodiments, multiplexing SR (e.g., on PUCCH) into PUSCH (e.g., data) transmission may be conducted if the ending symbol of PUSCH is not later than the ending symbol of PUCCH configured for SR transmission. Otherwise, e.g., if the last symbol of the PUSCH data is after the last symbol of the PUCCH (e.g., for the SR), the UE may drop the SR transmission. In some embodiments, such dropping the SR if the PUSCH extends beyond the PUCCH may apply when the priority order of SR and PUSCH data are the same (e.g., when no beta offset may apply), and multiplexing may be performed according to the beta offset in the case of different priority levels. In some embodiments, such dropping the SR if the PUSCH extends beyond the PUCCH may apply regardless of whether the priority order of SR and PUSCH data are the same or different (e.g., whether or not a beta offset may apply).

A third procedure for (e.g., inter-priority) collisions may relate to HARQ ACKs/NACKs and/or channel state information (CSI) (e.g., UCI other than SR) and data. In case of collision between an ACK/NACK or CSI (e.g., to be transmitted on PUCCH or potentially PUSCH) with data, a variety of UE behaviors may be applied, e.g., to adjust one or more UL transmissions to fit selected resources.

As one example, a number of sets of beta offset values given by:

$$\beta_{offset}^{HARQ-ACK,i}$$

may be configured by higher layers for HARQ-ACK (e.g., and/or NACK) multiplexing in PUSCH according to separate beta offset values (e.g., tables of offset values), wherein i is the set index. Each set:

$$\beta_{offset}^{HARQ-ACK,i}$$

may include a number of elements e.g.:

$$\beta_{offset,0}^{HARQ-ACK,i}, \beta_{offset,1}^{HARQ-ACK,i}, \beta_{offset,2}^{HARQ-ACK,i}$$

for the UE to use if the UE multiplexes HARQ-ACK in the PUSCH. The respective elements may be used if the UE multiplexes up to 2 HARQ-ACK bits, more than 2 and up to 11 bits, and more than 11 bits in the PUSCH, respectively. It will be appreciated that any ranges/thresholds for the number of HARQ-ACK bits may be used as desired and that different numbers of beta offset elements (e.g., potentially more than 3) may be used. For example, depending on the number of bits of HARQ-ACK (e.g., and/or NACK) information to transmit, and further depending on the relative priority of the HARQ-ACK information relative to the PUSCH data, the UE may determine the resources to use to multiplex the HARQ-ACK information with the PUSCH data. Similar to the (e.g., second) procedure for SR transmissions, if the HARQ-ACK information is higher priority, then the beta offset set may provide more and/or earlier resources for the HARQ-ACK information, and may thus achieve better latency and/or reliability performance.

As a second example, two sets of beta offset values:

$$<\beta_{offset}^{CSI-1,i}>$$

may be configured for Part 1 CSI reports and Part 2 CSI reports, where i is the set index. Pairs in Set 0 may be described as:

$$<\beta_{offset,0}^{CSI-1,0}, \beta_{offset,1}^{CSI-1,0}, \beta_{offset,0}^{CSI-2,0}, \beta_{offset,1}^{CSI-2,0}>,$$

and pairs in Set 1 may be described as:

$$<\beta_{\textit{offset},0}^{CSI-1,1}, \beta_{\textit{offset},1}^{CSI-1,1}, \beta_{\textit{offset},0}^{CSI-2,1},$$
$$\beta_{\textit{offset},1}^{CSI-2,1}>$$

Where:

$$<\beta_{\textit{offset},0}^{CSI-1,i}, \beta_{\textit{offset},1}^{CSI-1,i}, \beta_{\textit{offset},0}^{CSI-2,i},$$
$$\beta_{\textit{offset},1}^{CSI-2,i}>$$

Pairs in set 0 may be used for UE to multiplex up to 11 bits of CSI and pairs in set 1 may be used to multiplex more than 11 bits of CSI reports. It will be appreciated that thresholds other than 11 bits may be used as desired. Further, additional sets of beta-offset values may be used as desired.

In some embodiments, the set index and the beta offset value within the indicated set that are used for multiplexing HARQ-ACK or CSI parts may be signaled to a UE either by a DCI format scheduling the PUSCH transmission or by higher layers, e.g., higher layer signaling such as RRC.

In another embodiment, the beta offset value within the indicated set that are used for multiplexing HARQ-ACK or CSI parts may be signaled to a UE either by a DCI format scheduling the PUSCH transmission or by higher layers. However, the set index may be determined based on the priority order (e.g., of the transmission(s) being adjusted based on the beta offset value), which may be signaled by POI field in DCI Format and/or configured by RRC signaling. More specifically, one set of beta offset values may be configured or implicitly determined to be used for PUSCH with a particular service type. As one example, the set 0 may be used for HARQ-ACK or CSI feedback of URLLC service (e.g., targeting a higher reliability transmission) while, the 2nd set (e.g., set 1) may be used for HARQ-ACK or CSI associated with eMBB service (e.g., with a lower reliability target).

Figure 11:
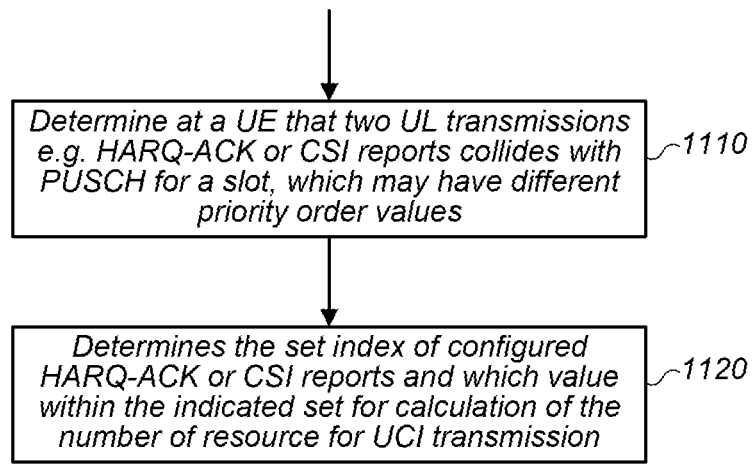
FIGS. 11-14 illustrate exemplary techniques for multiplexing uplink transmissions, according to some embodiments.

FIG. 11 is a flowchart of a method in accordance with this third procedure. With reference to FIG. 11, the UE may determine that two or more transmissions (e.g., and/or sets/groups of transmissions) collide for a slot (1110). One or more of the transmissions may be UCI such as HARQ-ACK information and/or CSI. Another transmission may include data, e.g., to be transmitted on PUSCH. The two transmissions may have different priority levels. The UE may determine what, if any, resources to use for the transmission (1120). For example, the UE may determine a set index for each transmission (e.g., based on the priority level of the HARQ-ACK and/or CSI report information) and which beta-offset value within the indicated set (e.g., based on the number of bits of the HARK-ACK and/or CSI) to determine the number and/or location of resources for UCI transmission, e.g., multiplexed with the data.

In a fourth procedure (e.g., for intra-group and/or inter-priority) collisions, a PUCCH resource indicator (PRI) may be included in DCI and may be used to adjust a UL transmission to fit the indicated resources, according to some embodiments. The PRI may be used to schedule UCI responsive to DL data, e.g., transmitted on PDSCH and scheduled by the DCI. The PRI may indicate which PUCCH resources (e.g., including the location and/or number of resources) the UE should use to for UCI (e.g., HARQ-ACK bits) corresponding to the PDSCH that is scheduled by the DCI. PRI may be an IE and may be included in various DCI formats, according to some embodiments. For example, a DL grant may schedule a DL transmission on PDSCH. The DL grant may use a DCI format that includes a PM. PRI may indicate which PUCCH resources (e.g., of multiple PUCCH resources that are configured by the BS) the UE should use to transmit UCI (e.g., HARQ-ACK feedback) in response to the DL transmission on PDSCH. In other words, the PRI of a DCI may be useful for dynamically indicating which PUCCH resources, e.g., of a plurality of configured PUCCH resources, may be used to transmit UCI responsive to DL data scheduled by the DCI.

Figure 12:
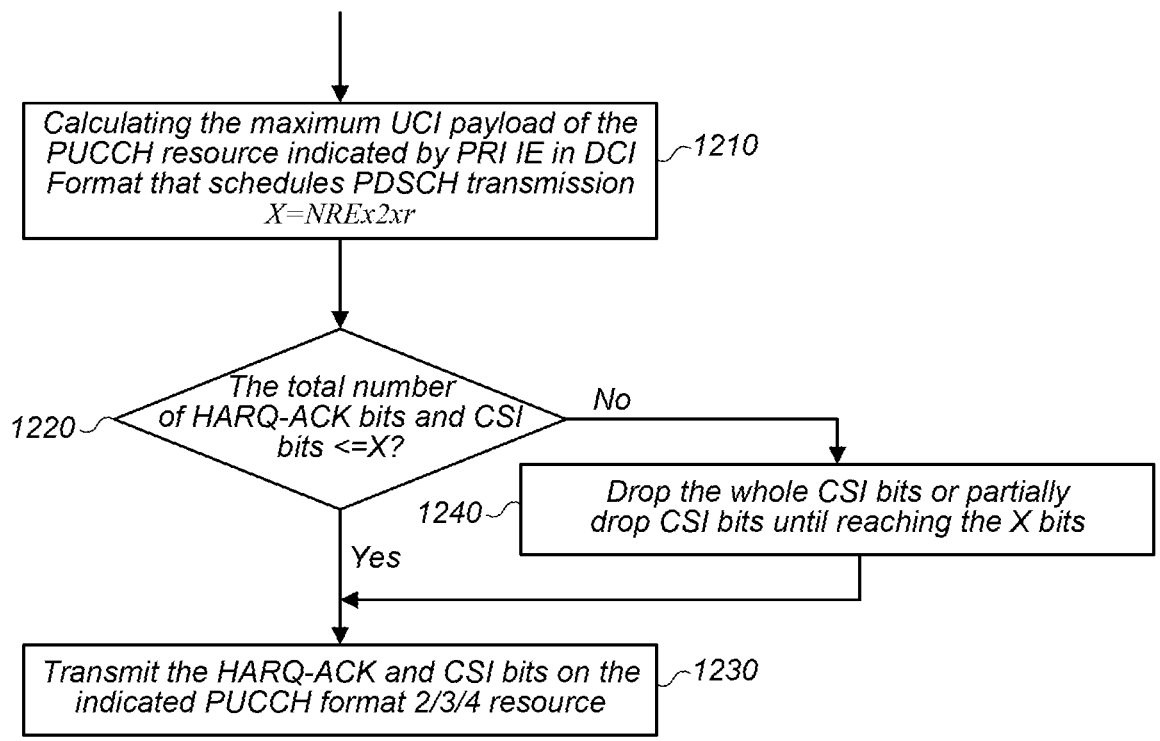

FIG. 12 illustrates a flowchart of a method in accordance with this fourth procedure, according to some embodiments. The UE may estimate a maximum payload of PUCCH resource indicated by a PRI in a DCI (1210), according to some embodiments. The maximum payload size, X, may be determined by: $X=N_{RE} \times 2 \times r$, e.g., for resources according to PUCCH formats 2, 3, or 4, where $N_{RE}$ is the number of REs available for UCI transmissions from the PUCCH formats 2, 3, or 4, and r is the maximum code rate (e.g., or MCS, etc.) for PUCCH formats 2, 3, or 4, e.g., as configured by higher layers (e.g., RRC signaling, e.g., in 802). In some embodiments, the code rate for HARQ-ACK and CSI are separately configured (e.g., with $r^{HARQ-ACK}$, $r^{CSI}$). The separate code rates may be used to determine the corresponding maximum bits number, X.

The UE may determine whether the total number of bits (e.g., of HARQ-ACK and/or CSI) is less than or equal to the maximum payload, X (1220). If the total number of bits is less than or equal to the maximum payload, the UE may transmit the HARQ-ACK and/or CSI on the PUCCH resources, e.g., in the indicated format (1230). However, if the total number of bits exceeds X, then some or all of the HARQ-ACK and/or CSI bits may be dropped (e.g., as needed to reach a transmission size not greater than X) (1240). HARQ-ACK and/or CSI bits may be dropped based on priority level (e.g., lower priority bits may be dropped first). For example, bits of a UL transmission of a lower priority service may be dropped first. Alternatively (e.g., for intra-group collisions), HARQ-ACK and/or CSI bits may be selectively dropped. As one example, the following priority order may be defined for HARQ-ACK and/or CSI bits selection: HARQ-ACK and/or CSI of component carrier (CC) with a lower index has higher priority for transmission compared to CSI of CC with a larger CC index. As a second example, CSI with smaller report identifier (ID) may have a higher priority than larger report ID. After enough CSI bits are dropped, the UE may proceed to transmit the HARQ-ACK and/or CSI (e.g., in 1230). It will be appreciated that the total number of bits may be evaluated (e.g., in 1220) before any potential dropping (e.g., without adjusting for any bits which may be dropped in 1240).

In other words, the UE may compare a bit size of one or more UL transmissions (e.g., UCI and/or data/PUSCH) to a maximum payload size for the transmission. If the bit size of the (e.g., summed) transmission(s) is greater than the maximum payload size, then the UE may drop one or more bits of the transmission(s) in order to stay within the maximum payload size. It will be appreciated that this fourth procedure may be applied iteratively. For example, if a group of transmissions of a lower priority are to be transmitted in the same slot as a group of transmissions of a higher priority, a first determination may be made to drop bits of the lower priority group, and a second determination may be made to drop bits of a particular transmission within the lower priority group (e.g., selected based on a CC index and/or report ID).

In some embodiments, bits before and/or after the HARQ-ACK and/or CSI payload (e.g., before or after the X bits indicated in the PRI) may be used for transmission of other transmissions, e.g., within the group and/or transmissions of another group.

Figure 13:
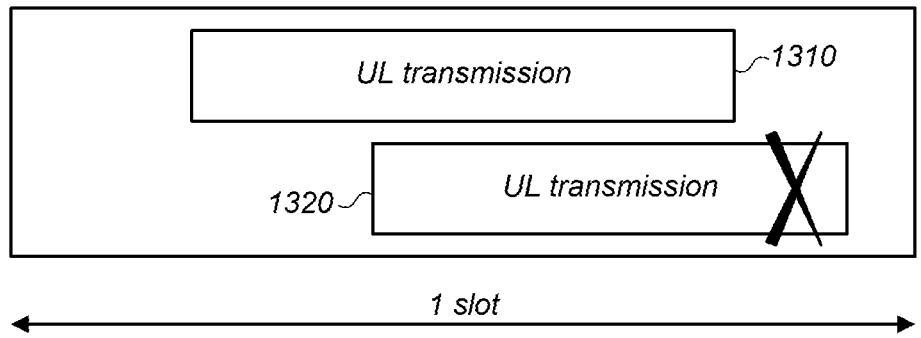
Figure 14:
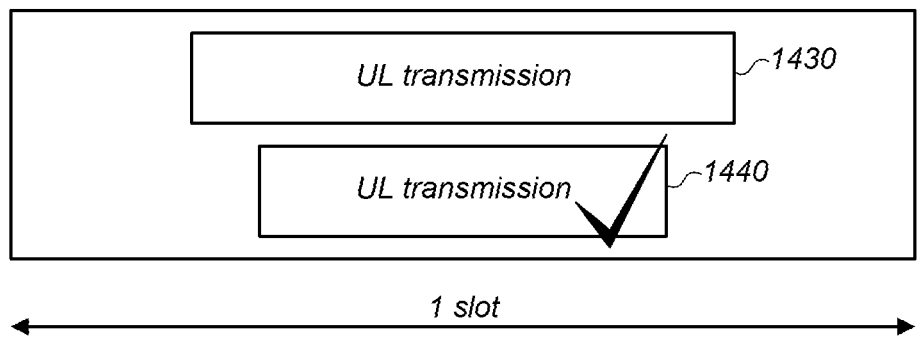

A fifth procedure for resolving (e.g., inter-priority) collisions may include multiplexing lower priority transmissions with higher priority transmissions, subject to the condition that the end (e.g., last symbol) of the lower priority transmission is not later than the end (e.g., last symbol) of the higher priority transmission. In other words, the UE may determine the respective ends of respective transmissions and multiplexing the lower priority transmission(s) (e.g., or group of transmissions) may be performed under circumstances in which the multiplexing will not delay the end of the transmission of the higher priority transmission (e.g., or group of transmissions). FIGS. 13 and 14 illustrate examples of this fifth procedure, according to some embodiments.

As shown in FIG. 13, in one example, UL transmission 1310 may have higher priority order than that of UL transmission 1320. Accordingly, the UE may drop UL transmission 1320 based on a determination that the ending symbol of UL transmission 1320 is later than that of UL transmission 1310.

In another example, as shown in FIG. 14, UL transmission 1430 may have higher priority order than that of UL transmission 1440. Accordingly, UL transmission 1440 may be multiplexed into (e.g., with) UL transmission 1430 based on a determination that the ending symbol of UL transmission 1440 is earlier than that of UL transmission 1430. It will be appreciated that any of the UL transmissions 1310, 1320, 1430, and/or 1440 may be a group of multiple transmissions.

A sixth procedure for resolving (e.g., inter-priority) collisions may concern collisions between SR and HARQ-ACK (e.g., and/or NACK) transmissions of different priority orders. For example, where an SR is configured with PUCCH format 0 and HARQ-ACK is configured with the same or different PUCCH format and the SR and HARQ-ACK have different priority orders, this sixth procedure may apply. The UE may drop either an SR transmission or HARQ-ACK transmission based on a predefined rule (e.g., or set of rules) or may transmit both the SR transmission and the HARQ-ACK transmission, e.g., depending on PUCCH format of either or both of the transmissions and/or other factors. Such a rule (or rules) may be designed to prioritize reliability of one type of transmission. Such a rule (or rules) may be configured by the network (e.g., in 802).

In some embodiments, the sixth procedure may involve successive application of various rules. As a first rule, in case of a negative SR (e.g., at a time configured for transmission of an SR, the UE may not have data to transmit and may not request resources), the UE may transmit the HARQ-ACK information, e.g., and may not transmit the (e.g., negative) SR. As a second rule, if a processing time budget is met (e.g., if the SR and the HARQ-ACK may be combined in the appropriate format sufficiently quickly), the UE may transmit both the (e.g., positive or negative) SR and HARQ-ACK bits. For example, the SR and HARQ-ACK may be transmitted using PUCCH format 0. As a third rule, if neither the first nor second rule is applicable, the UE may drop the HARQ-ACK transmission.

For example, if an SR is associated with a high priority (e.g., URLLC) and a HARQ-ACK is associated with a lower priority (e.g., eMBB), the successive rules may be applied as follows. If the SR is negative, the lower priority HARQ-ACK may be transmitted (e.g., according to the first rule). If the first rule is inapplicable and/or if the SR (e.g., positive or negative) may be combined with the HARQ-ACK sufficiently quickly, they may both be transmitted (e.g., according to the second rule). If the SR is positive and the SR may not be combined with the HARQ-ACK sufficiently quickly, the SR (e.g., only) may be transmitted and the HARQ-ACK may be dropped (e.g., according to the third rule).

As another example, if an SR is associated with a low priority (e.g., eMBB) and a HARQ-ACK is associated with a higher priority (e.g., URLLC), the successive rules may be applied as follows. If the SR is negative, the higher priority HARQ-ACK may be transmitted (e.g., according to the first rule). If the first rule is inapplicable and/or if the SR (e.g., positive or negative) may be combined with the HARQ-ACK sufficiently quickly, they may both be transmitted (e.g., according to the second rule). If the SR is positive and the SR may not be combined with the HARQ-ACK sufficiently quickly, the HARQ-ACK may be transmitted and the SR may be dropped (e.g., according to the third rule).

It will be appreciated that the rules may be applied in different orders, some rules may be omitted, and/or additional rules may be applied. For example, the second rule may only be applied after the first rule (e.g., the second rule may only be reached if the first rule is inapplicable because the SR is positive), according to some embodiments. In other embodiments, the second rule may be applied prior to the first rule (e.g., the second rule may be applied first, and thus may apply to positive or negative SR).

A seventh procedure for resolving (e.g., inter-priority) collisions may concern collisions between SR and CSI, e.g., with different priority orders. The UE may determine to transmit CSI together with the SR or to drop the CSI transmission based on the PUCCH format used for the SR transmission. For example, if the PUCCH format for the SR is a long PUCCH format, (e.g. PUCCH format 1, etc.) and the SR and CSI are associated with different priorities (e.g. one is URLLC and another is eMBB), the UE may transmit both SR and CSI bits on the PUCCH resource originally assigned for CSI transmission, e.g., after concatenating these bits into one sequence. In other words, if the PUCCH format applicable to one transmission is a long PUCCH format, both transmissions may be combined and transmitted on the resources for the CSI transmission. PUCCH for SR may typically be smaller than PUCHH for CSI; thus, PUCCH for CSI may be better able to accommodate both CSI and SR. In some embodiments, the UE may determine to concatenate the transmissions in response to determining that the size of the concatenated transmissions would be small enough to transmit on resources associated with one of the transmissions.

It will be appreciated that the procedures described above may be applied in any combination. For example, any one of the procedures may be applied individually and/or two or more of the procedures may be applied together. If two or more procedures are applied together, the procedures may be applied sequentially, e.g., in any order desired, and/or may be applied concurrently, e.g., in parallel.

Returning to FIG. 8, the UE may transmit the transmissions according to the order and/or multiplexing approach determined according to one or more of the procedures (808), according to some embodiments. The transmissions may be transmitted concurrently and/or sequentially, e.g., on resources according to one or more channels (e.g., PDSCH, PUSCH, etc.).

It will be appreciated that, although 804, 806, and 808 have been primarily described with respect to a PHY layer of the UE 106 performing UL transmissions, that embodiments of the present disclosure may be applied to a BS 102 performing DL transmissions. For example, a BS 102 may group one or more DL transmissions (804), resolve any collisions (806), and perform DL transmissions (808), according to some embodiments. Further, embodiments of the present disclosure may be applied by other layers of the UE and/or BS.

ADDITIONAL INFORMATION AND EXAMPLES

According to certain aspects of this disclosure, in the case of collision between UL transmissions with different priority orders, the UL transmission with lower priority order may be dropped, e.g., transmission of the lower priority may be stopped starting from the first overlapped symbols.

According to yet another aspects of this disclosure, if a UE has more than one overlapping resources for UL transmissions in a slot and at least two of the UL transmissions have a same priority order, the following collision handling procedure may be applied: the UE first groups the UL transmissions with a same priority order, then the UE follows the intra-group procedure for resolving the any overlap among the transmissions within the formed group(s), and then the UE may select and transmit the UL transmission across groups based on priority order.

It will be appreciated that although various of the procedures discussed above for resolving collisions have been described with respect to certain types of transmissions, the various procedures may apply to other types of transmissions. For example, the various beta offsets may be applied to different types of DCI, etc.

In a first set of embodiments, a method for operating a UE may comprise: at a physical (PHY) layer of the UE: connecting to a serving base station; determining respective types of at least two transmissions; determining respective priority levels of the at least two transmissions; resolving at least one collision between the at least two transmissions; and transmitting the at least two transmissions to the serving base station, wherein at least one of a transmission order or a multiplexing of the at least two transmissions is based on said resolving the at least one collision.

In a second set of embodiments, a method for operating a UE, may comprise: connecting to a base station; receiving configuration information for a plurality of services, wherein the first service is associated with a first set of transmission targets, wherein the second service is associated with a second set of transmission targets, wherein the first service is associated with a first priority, wherein the second service is associated with a second priority, wherein the first priority is higher than the second priority; transmitting a first transmission associated with the first service according to the first set of transmission targets; transmitting a second transmission associated with second service according to the second set of transmission targets; detecting a collision between a third transmission associated with the first service and a fourth transmission associated with the second service; applying one or more rules to resolve the collision; and performing a transmission according to the resolution.

In some embodiments, the first service may comprise ultra-reliable low latency communication.

In some embodiments, the second service may comprise enhanced mobile broadband.

In some embodiments, applying the one or more rules to resolve the collision and performing the transmission according to the resolution may comprise transmitting the third transmission and dropping the fourth transmission.

In some embodiments, applying the one or more rules to resolve the collision and performing the transmission according to the resolution may comprise transmitting the third transmission first and transmitting the fourth transmission second.

In some embodiments, applying the one or more rules to resolve the collision and performing the transmission according to the resolution may comprise multiplexing the third transmission and the fourth transmission.

In some embodiments, applying the one or more rules to resolve the collision and performing the transmission according to the resolution may comprise transmitting the third transmission and the fourth transmission at the same time.

In some embodiments, the third transmission may use a lower coding rate than the fourth transmission.

In some embodiments, the third transmission may comprise a scheduling request.

In some embodiments, the third transmission may comprise PUSCH data.

In some embodiments, the third transmission may comprise an acknowledgement.

In some embodiments, the configuration information may specify the first priority level for the first service and the second priority level for the second service.

In some embodiments, said detecting and said applying may be performed at a physical (PHY) layer of the UE.

In some embodiments, the method may further comprise: receiving downlink control information (DCI) for the third transmission associated with the first service, wherein the DCI for the third transmission specifies the first priority level; wherein said applying the one or more rules is based on the DCI for the third transmission specifying the first priority level.

In some embodiments, the DCI for the third transmission may include a priority order indicator (POI) field specifying the first priority level.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
at a user equipment device (UE):
connecting to a base station;
receiving configuration information for a plurality of services, wherein a first service is associated with a first set of latency and/or reliability targets, wherein a second service is associated with a second set of latency and/or reliability targets, wherein the first service is associated with a first priority, wherein the second service is associated with a second priority, wherein the first priority is higher than the second priority;
at a first time:
transmitting a first transmission associated with the first service according to the first set of latency and/or reliability targets; and
transmitting a second transmission associated with the second service according to the second set of latency and/or reliability targets;
at a second time:
receiving, from the base station, first downlink control information (DCI) scheduling a third transmission associated with the first service, the first DCI indicating a first priority for the third transmission using a priority field of one or more bits;
receiving, from the base station, second DCI scheduling a fourth transmission associated with the second service, the second DCI indicating a second priority for the fourth transmission using the priority field;
detecting a collision during a symbol of a first slot between the third transmission and the fourth transmission;
applying one or more rules to resolve the collision based at least in part on the first priority and the second priority; and
performing a transmission during the first slot according to the resolution; and
at a third time:
receiving, from the base station, third DCI scheduling a fifth transmission, the third DCI not including the priority field.

2. The method of claim 1, wherein the first service comprises ultra-reliable low latency communication and the second service comprises enhanced mobile broadband.

3. The method of claim 1, wherein said detecting and said applying are performed at a physical (PHY) layer of the UE, wherein said applying the one or more rules to resolve the collision and performing the transmission according to the resolution comprises transmitting the third transmission and dropping the fourth transmission.

4. The method of claim 1, wherein said detecting and said applying are performed at a lower layer of the UE, wherein said applying the one or more rules to resolve the collision and performing the transmission according to the resolution comprises multiplexing the third transmission and the fourth transmission.

5. The method of claim 1, wherein respective priority fields of the first and second DCI comprise 1 bit, wherein the third DCI includes zero bits for the priority field.

6. The method of claim 1, wherein said performing the transmission during the first slot comprises adjusting an amount of resources used for the transmission based on a maximum payload size.

7. The method of claim 6, wherein said adjusting the amount of resources comprises:
determining a sum of a bit size of the third transmission and a bit size of the fourth transmission;
determining that the sum exceeds the maximum payload size; and
dropping at least one bit based on the determination that the sum exceeds the maximum payload size.

8. The method of claim 6, wherein said adjusting the amount of resources comprises adjusting a time used for at least one of the third transmission and/or the fourth transmission.

9. A method, comprising:
at a base station:
connecting to a UE;
transmitting, to the UE, configuration information for a plurality of services, wherein a first service is associated with a first set of latency and/or reliability targets, wherein a second service is associated with a second set of latency and/or reliability targets, wherein the first service is associated with a first priority, wherein the second service is associated with a second priority, wherein the first priority is higher than the second priority;
at a first time:
receiving, from the UE, a first transmission associated with the first service according to the first set of latency and/or reliability targets; and
receiving, from the UE, a second transmission associated with the second service according to the second set of latency and/or reliability targets;
at a second time:
transmitting, to the UE, first downlink control information (DCI) scheduling a third transmission associated with the first service, the first DCI indicating a first priority for the third transmission using a priority field of one or more bits;
transmitting, to the UE, second DCI scheduling a fourth transmission associated with the second service, the second DCI indicating a second priority for the fourth transmission using the priority field; and
receiving, from the UE according to the first and second DCI; and
at a third time:
transmitting, to the UE, third DCI scheduling a fifth transmission, the third DCI not including the priority field.

10. The method of claim 9, wherein the first service comprises ultra-reliable low latency communication and the second service comprises enhanced mobile broadband.

11. The method of claim 9, wherein respective priority fields of the first and second DCI comprise 1 bit, wherein the third DCI includes zero bits for the priority field.

12. The method of claim 9, wherein said receiving at the second time includes an amount of resources based on a maximum payload size.

13. An apparatus, comprising:
a processor configured to cause a user equipment device (UE):
connect to a base station;
receive configuration information for a plurality of services, wherein a first service is associated with a first set of latency and/or reliability targets, wherein a second service is associated with a second set of latency and/or reliability targets, wherein the first service is associated with a first priority, wherein the second service is associated with a second priority, wherein the first priority is higher than the second priority;
at a first time:
  transmit a first transmission associated with the first service according to the first set of latency and/or reliability targets; and
  transmit a second transmission associated with the second service according to the second set of latency and/or reliability targets;
at a second time:
  receive, from the base station, first downlink control information (DCI) scheduling a third transmission associated with the first service, the first DCI indicating a first priority for the third transmission using a priority field of one or more bits;
  receive, from the base station, second DCI scheduling a fourth transmission associated with the second service, the second DCI indicating a second priority for the fourth transmission using the priority field;
  detect a collision during a symbol of a first slot between the third transmission and the fourth transmission;
  apply one or more rules to resolve the collision based at least in part on the first priority and the second priority; and
  perform a transmission during the first slot according to the resolution; and
at a third time:
  receive, from the base station, third DCI scheduling a fifth transmission, the third DCI not including the priority field.

14. The apparatus of claim 13, wherein the first service comprises ultra-reliable low latency communication and the second service comprises enhanced mobile broadband.

15. The apparatus of claim 13, wherein said detecting and said applying are performed at a physical (PHY) layer of the UE, wherein said applying the one or more rules to resolve the collision and performing the transmission according to the resolution comprises transmitting the third transmission and dropping the fourth transmission.

16. The apparatus of claim 13, wherein said detecting and said applying are performed at a lower layer of the UE, wherein said applying the one or more rules to resolve the collision and performing the transmission according to the resolution comprises multiplexing the third transmission and the fourth transmission.

17. The apparatus of claim 13, wherein respective priority fields of the first and second DCI comprise 1 bit, wherein the third DCI includes zero bits for the priority field.

18. The apparatus of claim 13, wherein to perform the transmission during the first slot, the processor is further configured to cause the UE to adjust an amount of resources used for the transmission based on a maximum payload size.

19. The apparatus of claim 18, wherein to adjust the amount of resources, the processor is further configured to cause the UE to:
  determine a sum of a bit size of the third transmission and a bit size of the fourth transmission;
  determine that the sum exceeds the maximum payload size; and
  drop at least one bit based on the determination that the sum exceeds the maximum payload size.

20. The apparatus of claim 18, wherein to adjust the amount of resources, the processor is further configured to cause the UE to:
  adjust a time used for at least one of the third transmission and/or the fourth transmission.

* * * * *